United States Patent Office 3,426,169
Patented Feb. 4, 1969

3,426,169
APPARATUS FOR THE RESISTANCE WELDING OF CHAIN LINKS
Egon Göte Alf Wehlin, Huddinge, Sweden, assignor to Elektriska Svetsningsaktiebolaget, Goteborg, Sweden, a corporation of Sweden
Filed Nov. 29, 1966, Ser. No. 597,714
Claims priority, application Sweden, Dec. 8, 1965, 15,858/65
U.S. Cl. 219—51       6 Claims
Int. Cl. H05b 1/00; B21l 3/02

ABSTRACT OF THE DISCLOSURE

This disclosure relates to a chain welding machine of the kind in which the link ends to be welded are each clamped by a pair of clamping members one or both of which are connected to one terminal of a source of welding current. According to the disclosure, the link to be welded has such a position with regard to the clamping members that the clamping force is parallel to the plane of the link. One clamping member in each of the pairs of clamping members is adapted to straddle the jointless side of the link, while the other clamping member has a groove adapted to receive and position the link end. A pair of auxiliary members inserted into the link at right angles to the link plane serve to transmit the clamping force from the first-mentioned clamping members to the respective link ends. Said auxiliary members may be constituted by the next adjacent links of the chain. The disclosure provides accurate alignment of the link ends and imposes no dimensional limitations on the grooved clamping member.

---

This invention relates to apparatus for the resistance welding of chain links of the kind having a welded joint in one of the longer sides of the link. More particularly, the invention relates to apparatus comprising two pairs of clamping members, said pairs being relatively movable towards and away from each other and adapted each to clamp one of the link ends to be joined, one of the clamping members of each pair being connected to a source of current and constituting a welding electrode. The expression "relatively movable" is used to include not only the case in which both of the pairs of clamping members are movable with regard to the stationary part of the apparatus, but also the case in which one of the pairs of the clamping members is stationary.

In conventional apparatus of this type, the link to be welded is held between the clamping members in a position in which the plane of the link is at right angles to the direction of the clamping force. For the reason explained below with reference to FIGS. 1 and 2, said known apparatus cannot be relied upon to provide a proper alignment of the link ends to be welded.

It is a principal object of the present invention to provide improved apparatus of the type above specified which automatically ensures a proper alignment of the link ends during the welding operation.

According to the invention, one of the clamping members of each pair of clamping members has a recess for admitting a portion of the link at the jointless long side of the link, a pair of members inserted into the link transversely to the plane of the link being provided for transmitting the clamping force from said recessed clamping members to the link ends, the other clamping member of each of the pairs of clamping members being provided with a groove adapted to engage and position the link end.

The aforesaid force transmitting members inserted into the link may advantageously be constituted by the next adjacent links of the chain.

Figure 1:
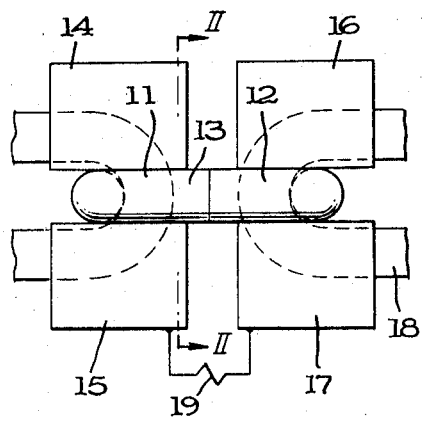
Figure 2:
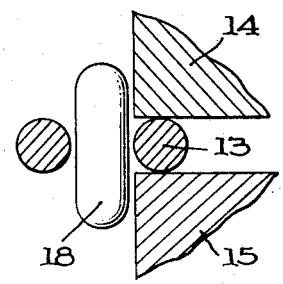
Figure 3:
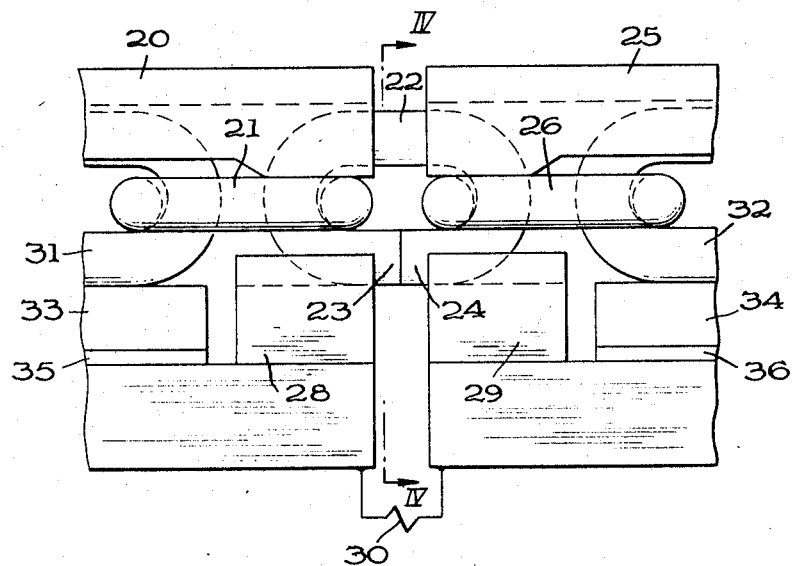
Figure 4:
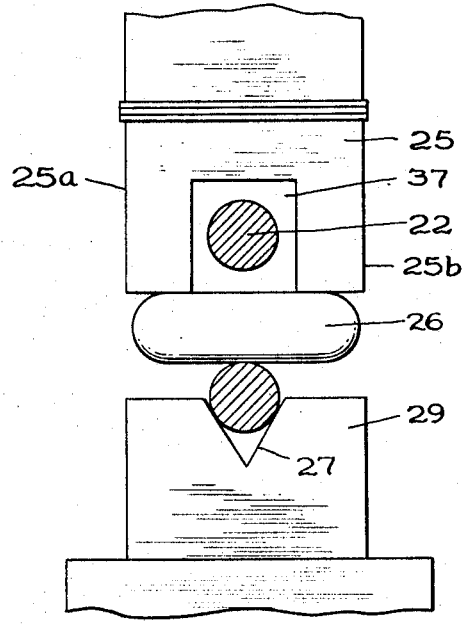
Figure 5:
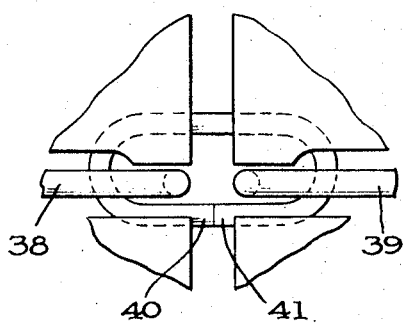
Figure 6:
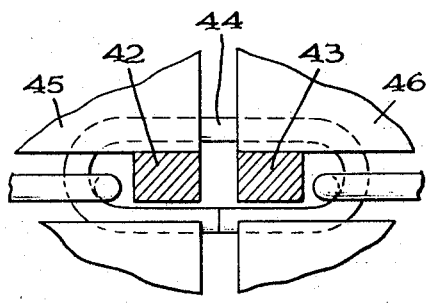

In the accompanying drawings,
FIG. 1 is a side view of two pairs of clamping members in a conventional chain welding apparatus,
FIG. 2 is a sectional view taken along the line II—II of FIG. 1,
FIG. 3 is a side view showing the clamping members as well as the adjoining parts of an apparatus according to the invention,
FIG. 4 is a sectional view taken along the line IV—IV of FIG. 3, the scale of FIG. 4 being larger than the one of FIG. 3,
FIGS. 5 and 6 are side views showing two different examples of the clamping arrangements of apparatus according to the invention for the welding of long links.

In the conventional arrangement shown in FIGS. 1 and 2, the ends 12, 13 of a link 11 previously bent into the desired shape are clamped by the pairs of clamping members 14, 15 and 16, 17, respectively. The lower clamping members 15, 17 are each connected to a terminal of a welding source 19 to serve as electrodes. Conventional means not shown in the drawing are provided for moving the pairs of clamping members and the link ends clamped therein towards each other for the performance of the welding operation, which can be carried out as flash-butt welding or resistance-butt welding. As evident from FIG. 2, the lateral overlap of the clamping members with respect to the link ends is limited at one side by the presence of the adjacent links 18. The provision of grooves in the clamping members for the positioning of the link ends is therefore impossible or difficult for lack of space. It is, therefore, not possible to correct or prevent any lack of alignment of the link ends which may be present prior to the commencement of the welding operation or occur during the performance of the welding operation.

The apparatus according to the invention illustrated in FIGS. 3 and 4 comprises a first pair of clamping members 20, 28 and a second pair of clamping members 25, 29. The clamping members 28, 29 are each connected to one terminal of a source of welding current 30 and serve as welding electrodes. Conventional means not illustrated in the drawing are provided for applying a clamping force to each of the upper clamping members 20, 25 and for causing the pairs 20, 28 and 25, 29 of clamping members to be displaced towards each other for the carrying out of the welding operation. The link 22 to be welded is inserted between the clamping members in such a position that its plane is vertical. The upper clamping members 20, 25 are each provided with a recess 37 (FIG. 4) for admitting the upper part of the link 22, the width and depth of said recess being sufficient to ensure that the part of the link accommodated in said recess is subjected to no clamping force by the upper clamping member. In the embodiment shown, the recess forms a straight channel confined between two depending parts or flanges 25a, b, of the upper clamping member 25, said channel being open at both ends. The lower clamping members 28, 29 are each provided with a V-shaped groove 27 (FIG. 4) for receiving and positioning the link ends 23, 24. The clamping force required for uring the link ends into the grooves is exerted upon the link ends by the curved portions of the next adjacent links 21, 26 of the chain under the action of the depending parts 25a, 25b of the upper clamps 20, 25. Thus, the adjacent links 21, 26 serve to transmit the clamping force from the clamping members 20, 25 to the link ends 23, 24 to be welded. To maintain the links 21, 26 in the proper horizontal position, special supports 33, 34 electrically insulated from the clamps 28, 29 by the layers of insulation 35, 36 are provided for the next succeeding links 31, 32 which in their turn support the outer ends of the links 21, 26. Alternatively, the clamps 28, 29 may be extended so as to support the links 31, 32 as well as the link 22.

The arrangement described results in a perfect alignment of the link ends 23, 24 while at the same time allowing the use of electrode clamps 28, 29 of considerable width, resulting in ample mechanical strength and current carrying capacity.

In the apparatus for the welding of long links illustrated in FIG. 5, the links 38, 39 are pushed inwards (towards each other) prior to the clamping operation in order to place their curved inner ends in the position required for transmitting the clamping force from the upper clamping members to the link ends 40, 41 to be welded. In the apparatus shown in FIG. 6, the clamping force is transmitted from the upper clamping members 45, 46 by means of a pair of straight auxiliary bars 42, 43 inserted into the link 44 prior to the clamping operation.

While the invention is applicable to the welding of link stock of any dimension, it is particularly valuable in the welding of small or medium-size stock having diameters up to 20 mm.

I claim:

1. Apparatus for the resistance welding of chain links of the kind having a welded joint in one of the long sides of the link, comprising two pairs of clamping members, said pairs being relatively movable towards and away from each other and adapted each to clamp one of the link ends to be joined, one of the clamping members of each pair being connected to a source of welding current and constituting a welding electrode, wherein the improvement comprises the following features:
   (a) one of the clamping members of each pair of clamping members has a recess for admitting a portion of the link at the jointless long side of the link;
   (b) a pair of members inserted into the link transversely to the plane of the link are provided for transmitting the clamping force from said recessed clamping members to the link ends;
   (c) the other clamping member of each of the pairs of clamping members is provided with a groove adapted to receive and position the link end.

2. Apparatus as claimed in claim 1 in which the groove has a V-shaped cross-section.

3. Apparatus as claimed in claim 1 in which each of the members inserted into the link transversely to the plane of the link is a straight bar, preferably of rectangular cross-sectional shape.

4. Apparatus as claimed in claim 1 in which the recess forms a channel or groove open at both ends.

5. Apparatus for the resistance welding of chain links of the kind having a welded joint in one of the long sides of the link, comprising two pairs of clamping members, said pairs being relatively movable towards and away from each other and adapted each to clamp one of the link ends to be joined, one of the clamping members of each pair being connected to a source of welding current and constituting a welding electrode, wherein the improvement comprises the following features:
   one of the clamping members of each pair of clamping members is adapted to straddle a portion of the link at the jointless long side of the link and to bear against the next adjacent link of the chain to cause the part of said next adjacent link traversing the link to be welded to transmit the clamping force to one link end of the link to be welded; and
   the other clamping member of each of the pairs of clamping members is provided with a groove adapted to receive and position the link end.

6. Apparatus as claimed in claim 5 in which the groove has a V-shaped cross-section.

References Cited

FOREIGN PATENTS

| | | |
|---|---|---|
| 328,718 | 11/1920 | Germany. |
| 334,730 | 12/1958 | Switzerland. |
| 402,792 | 3/1943 | Italy. |

OTHER REFERENCES

Thiele: German application Ser. No. T5543, printed Feb. 23, 1956, 4 pages specification, 3 pages DWG.

RICHARD M. WOOD, *Primary Examiner.*

B. A. STEIN, *Assistant Examiner.*

U.S. Cl. X.R.

59—33, 34